United States Patent

[11] 3,543,841

[72] Inventor George Y. Eastman
Lancaster, Pennsylvania
[21] Appl. No. 676,582
[22] Filed Oct. 19, 1967
[45] Patented Dec. 1, 1970
[73] Assignee RCA Corporation
a corporation of Delaware

[54] HEAT EXCHANGER FOR HIGH VOLTAGE ELECTRONIC DEVICES
7 Claims, 2 Drawing Figs.

[52] U.S. Cl. .......... 165/80,
165/105; 317/234; 174/35.5; 313/12, /44
[51] Int. Cl. .......... F28d 15/00;
H01j 7/24
[50] Field of Search .......... 165/105,
80; 317/234; 174/15, 35.5; 313/12, 44

[56] References Cited
UNITED STATES PATENTS

| | | | |
|---|---|---|---|
| 2,883,591 | 4/1959 | Camp .......... | 317/234 |
| 3,024,298 | 3/1962 | Goltsos et al. .......... | 165/105X |
| 3,229,759 | 1/1966 | Grover .......... | 165/105 |
| 3,270,250 | 8/1966 | Davis .......... | 317/100 |
| 3,382,313 | 5/1968 | Angello .......... | 165/105X |

FOREIGN PATENTS

| | | | |
|---|---|---|---|
| 1,266,244 | 5/1961 | France .......... | 317/234 |
| 1,026,606 | 4/1966 | Great Britain .......... | 317/234 |

OTHER REFERENCES

Cotter, TP Heat Pipes, Los Alamos Scientific Laboratory (LA-3246-MS), 3/1965, pp 33

Deveral et al., JE High Thermal Conductance Devices, Los Alamos Scientific Laboratory (LA-3211-MS), 4/1965, pp 34, 35

Feldman Jr. et al., KT Heat Pipe, In Mechanical Engineering 2/1967 pp 30 TJI.A72

*Primary Examiner*—Robert A. O'Leary
*Assistant Examiner*—Albert W. Davis
*Attorney*—Glenn H. Bruestle

ABSTRACT: A heat exchanger incorporating a modified heat pipe is used to provide heat transfer and electrical insulation for electrical or electronic devices which dissipate thermal power from electrodes or elements operating at relatively high voltages with respect to an ultimate heat sink. The heat pipe structure includes an insulating region which separates a relatively high voltage heat input region from a relatively low voltage heat output region, and may also include a gas trap region beyond the heat output region to which unwanted gases are driven during heat pipe operation.

Patented Dec. 1, 1970 3,543,841

INVENTOR
George Y. Eastman

BY L. A. Larsen
ATTORNEY

HEAT EXCHANGER FOR HIGH VOLTAGE ELECTRONIC DEVICES

BACKGROUND OF THE INVENTION

1. Field of the Invention

The invention relates to an improved heat exchanger for high voltage electronic devices and particularly to a heat exchanger incorporating the principles of a heat pipe.

2. Description of the Prior Art

Some types of known electron tubes and semiconductors having electrodes operating at high voltages, produce a large amount of heat and must be cooled by artificial means. Because of the high operating voltages of these electrodes, the heat dissipation means utilized must provide electrical insulation. Cooling means heretofore available for such electrodes comprise the provision of a relatively large heat sink and heat dissipation means for removing heat from the heat sink by radiation, natural convection or forced convection of a coolant. The relatively large heat sink is provided by thick electrode walls made of a metal having a fairly high thermal conductivity such as copper. Prior methods of dissipating heat from the heat sink involved the forced circulation of a coolant in close proximity to the heat sink or the mounting of heat dissipators on the electrode which were fabricated of electrically insulating and heat conducting material such as beryllium oxide. A mechanical blower could also be used to direct a stream of air around the electrode to provide cooling and electrical insulation.

The various types of cooling means referred to in the foregoing, and heretofore provided for high voltage electronic devices, are rather inefficient heat dissipators and often involve excessive cost. Thermal conducting ceramics such as beryllium oxide, which can provide the needed electrical insulation, are relatively inefficient heat dissipators. Beryllium oxide is also toxic, making handling difficult.

Heat pipes have proven to be very efficient in dissipating heat from relatively low voltage electrodes, but prior art heat pipes would not provide the insulation necessary in the case of an electrode operating at a high voltage relative to the heat dissipation means. When a heat pipe is used to cool a relatively high voltage electrode, the heat input region is at a higher voltage than the heat output region and insulation must be provided between these two regions to prevent voltage breakdown.

Another objectionable feature of prior art heat pipes when used between regions of appreciable voltage difference is the presence of traces of atmospheric gases remaining within the heat pipe. Some of these gases can ionize, causing voltage breakdown within a heat pipe which is used to cool a high voltage electrode.

SUMMARY OF THE INVENTION

The foregoing problems of dissipating heat from high voltage electronic components are overcome by a modified heat pipe structure which includes an electrically insulating region. The electrically insulating region of the heat pipe is positioned between the relatively high voltage heat input region and the lower voltage heat output region to prevent voltage breakdown. The heat transfer medium in the heat pipe as well as those portions of the capillary lining and outer wall of the heat pipe located within this intermediate insulating region are fabricated of electrically insulating materials.

In order to prevent ionized residual gases which remain within the heat pipe envelope from causing voltage breakdown in the insulating region of the heat pipe, a gas trap region may be provided to contain these gases in an area of the heat pipe spaced from the insulating region. During operation, the expanding vaporized heat transfer medium sweeps these unwanted atmospheric gases out of the insulating region and into the gas trap region of the heat pipe. Pressure from the expanding vaporized heat transfer medium holds these gases in the gas trap region and prevents them from returning to the insulating region while the heat pipe is operating. The presence of this gas trap region has the additional advantage of permitting the heat pipe to tolerate a greater amount of residual gas so that it can be processed with simpler and less expensive vacuum techniques.

DESCRIPTION OF THE PREFERRED EMBODIMENT

Figures 1, 2:
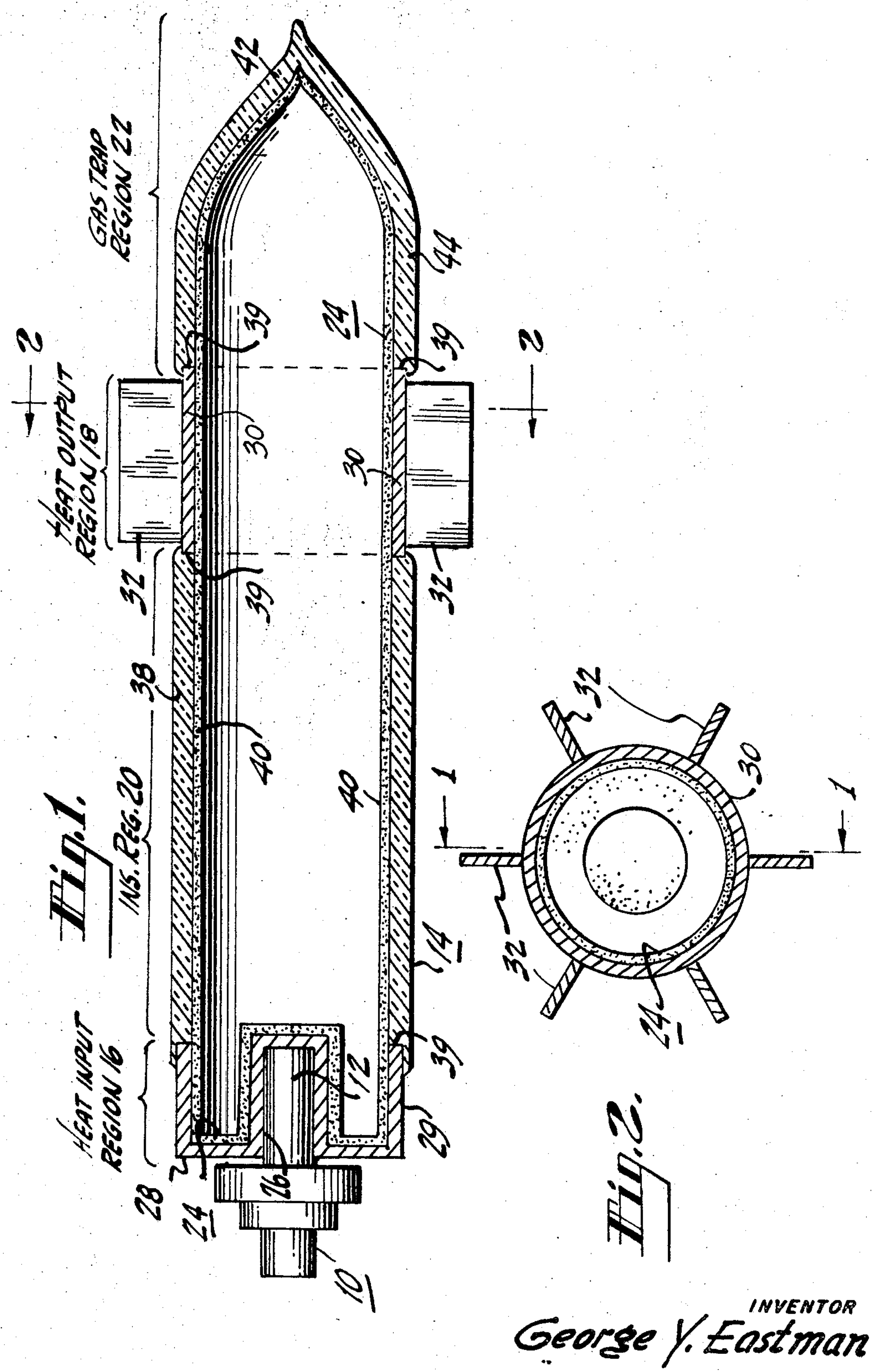
FIG. 1 is a longitudinal sectional view of a preferred embodiment according to the present disclosure of an insulating heat pipe for use between regions of appreciable voltage differences and FIG. 2 is a sectional view taken along the line 2–2 of FIG. 1.

In the preferred embodiment of the invention shown in FIG. 1 an electron tube 10 having a relatively high voltage anode 12 is cooled by a modified heat pipe structure 14. The heat pipe structure 14 comprises an active zone including a heat input region 16, a heat output region 18, an insulating region 20 and an inactive zone consisting of a gas trap region 22. A lining of porous capillary material 24 engages the inner wall of the heat pipe structure 14. The capillary lining 24 is saturated with a heat transfer medium of electrically insulating material having a substantial vapor pressure at the operating temperature of the heat pipe.

During operation, the heat input region 16 of the heat pipe is placed in heat transfer relation with respect to the anode 12. The anode 12 extends into a depression 26 formed in the end portion 28 of the outer wall 29 of the heat pipe in the heat input region 16. The depression 26 is shaped to fit tightly against the outer surface of the anode 12 to insure good thermal contact. The outer wall 29 of the heat pipe in the heat input region 16 is made of a material having good heat conducting properties such as a metal. The capillary lining 24 of the heat pipe covers the inner surface of the outer wall 29 including those portions of the outer wall surrounding the anode 12 so that the heat transfer medium within the capillary walls 24 can efficiently absorb by vaporization heat generated by the anode 12.

Alternatively, the anode 12 may form an integral part of the end wall 28 of the heat pipe in the heat input region 16. The wall of the anode 12 would then be sealed to the surrounding end wall 28 of the heat pipe and the depression 26 in the end wall 28 would be eliminated. The capillary lining 24 would then be attached directly to those portions of the surface of the anode 12 which extends into the heat input region 16 of the heat pipe.

Heat taken up from the high voltage anode 12 by the heat input region 16 of the heat pipe is dissipated in the heat output region 18 of the heat pipe. The exterior wall 30 of the heat pipe in the heat output region 18 is also made of a material having good heat conducting properties, such as a metal , allowing heat to be transferred from the capillary lining 24 in the heat output region 18 to external heat dissipating means. In this preferred embodiment the external heat dissipators include a number of metallic radiator fins 32 attached to the external wall 30 of the heat pipe.

The insulating region 20 of the heat pipe is located between the heat input region 16 and the heat output region 18 in order to electrically insulate the high voltage anode 12 from the metallic heat dissipators, such as the radiator fins 32, placed around the exterior of the heat output region 18. The outer wall 38 of the heat pipe in the insulating region 20 is constructed of a glass or a similar insulating material. Glass to metal seals 39 connect the glass wall 38 of the heat pipe to the metallic walls 29 and 30. A portion 40 of the capillary lining 24 engaging the inner surface of the glass wall 38 in the insulating region 20 is made of a porous insulating material such as porous ceramic or fiber glass. In the embodiment shown in FIG. 1 the entire capillary lining 24 is made of the same porous insulating material but this is not required. The heat transfer medium, however, must be a material having insulating properties in both its liquid and vapor phases, such as chemically stable volatile hydrocarbons or fluoridated hydrocarbons, since it is present throughout the entire interior of the heat pipe. Specific usable heat transfer mediums include carbon tetrachloride, kerosene and freon.

An inactive gas trap region 22 is included in the heat pipe to contain unwanted atmospheric gases which may be present in the heat pipe envelope. The gas trap region 22 is located between the heat output region 18 and the end of the heat pipe 42 remote from the heat input region 16. The capillary lining 24 covers the inner walls of the heat pipe in this region to absorb any of the heat transfer medium which might condense there. The outer wall 44 of the heat pipe in this area can be made of any convenient material and need not be an insulating material as shown in this embodiment.

When the electron tube 10 is operating, thermal energy is generated in the anode 12. The resultant heat is conducted into the heat input region 16 of the heat pipe 14 through the metallic wall 29. The heat transfer medium which is present in the capillary walls 24 engaging the inner surface of metallic wall 29 of the heat input region 16, is vaporized and absorbs heat, thereby cooling the anode 12. After vaporization, the heat transfer medium moves throughout the heat pipe 14 and condenses on the capillary walls 24 of the heat output region 18, thereby giving up its latent heat of vaporization. This heat is conducted through the outer wall 30 in the heat output region 18 and can then be dissipated in any convenient manner. In the embodiment shown in FIG. 1, heat is dissipated by radiator fins 32 attached to the outer surface of metallic wall 30. After condensing in the heat output region 18, the heat transfer medium in liquid form moves through the capillary walls 24 and 40 to fill the areas of the capillary lining 24 in the heat input region 16 of the heat pipe which were vacated by the heat transfer medium during vaporization. In this way heat is continuously transferred from the anode 12 to the heat output region 30 of the heat pipe where it is dissipated.

Because the anode 12 operates at a relatively high voltage with reference to the heat output region 18, a large voltage gradient exists between the heat input region 16 and the heat output region 18 of the heat pipe. Since the heat dissipating means associated with the heat output region 18 includes metallic components such as the radiator fins 32, there is a problem of voltage breakdown between the heat input and heat output regions of the heat pipe. In order to lessen the likelihood of voltage breakdown, the high voltage heat input region 16 is separated from the lower voltage heat output region 18 by the insulating region 20.

Residual gases remaining after the evacuation of the heat pipe 14 or evolved during the operation of the device are swept out of the active zone of the heat pipe and into the gas trap region 22 by a diffusion pump principle as the vapor stream of heat transfer medium flows from the heat input region 16 to the heat output region 18. This removes these gases to the area of the gas trap region 22 located at the end of the heat pipe 42. In this way, gases such as oxygen or nitrogen which could cause voltage breakdown if allowed to remain in the insulating region between the heat input and heat output regions are removed from the insulating region of the heat pipe. Pressure from the vaporized heat transfer medium holds these unwanted gases in the gas trap region 22, while the heat pipe is operating and prevents them from returning to the insulating region 20.

The voltage which the heat pipe structure 14 will withstand is determined by the length of the insulating region 20 and voltage breakdown characteristics of the materials used in making the insulating region 20. An overall length of 1.5 inches per 10,000 volts has been found to be an acceptable length for the insulating region. A heat pipe having a design similar to that shown in FIG. 1 was constructed using the materials indicated above. This heat pipe cooled an electrode operating at 5000 volts to a temperature of 150° C. without voltage breakdown.

I claim:

1. A hollow, sealed heat pipe structure for cooling a device which operates at a relatively high voltage with respect to an ultimate heat sink, comprising:

a. an outer envelope having inner and outer surfaces, said envelope including:
  - i. a heat input region adapted to be disposed in heat transfer relation with said device, said envelope in said heat input region being constructed essentially of heat conductive and electrically noninsulative material;
  - ii. a heat output region spaced from said heat input region, said envelope in said heat output region being constructed essentially of heat conductive and electrically noninsulative material; and
  - iii. an electrically insulating region between said heat input region and said heat output region;

b. a continuous capillary lining adjacent to the inner surface of said envelope, at least a portion of said capillary lining adjacent said electrically insulating region being electrically insulating; and c. a heat transfer medium disposed within said out envelope, said heat transfer medium being electrically insulating in both its liquid and vapor states and being vaporizable at the operating temperature of said heat input region.

2. A heat pipe as described in claim 1 including:

a. unwanted residual gases retained in said working medium; and b. a gas trap region spaced from said heat output region in the direction away from said heat input region to contain said unwanted residual gases.

3. A heat pipe as described in claim 2 wherein said gas trap region provides space for the accumulation of said unwanted gases in sufficient spaced relation from the said insulated region to prevent voltage breakdown.

4. A heat pipe as described in claim 2 said gas trap region has a sufficient volume to contain all of said unwanted residual gases at the operating temperature and pressure of the heat pipe.

5. A heat pipe as described in claim 1 wherein the envelope of said heat pipe in said heat input region is constructed essentially of metal.

6. A heat pipe as described in claim 1 wherein the envelope of said heat pipe in said heat output region is constructed essentially of metal.

7. A heat pipe as described in claim 1 wherein said heat input and said heat output regions of said envelope consist essentially of metal and said electrically insulating region consists essentially of glass, said heat input and heat output regions being hermetically sealed to said insulating region by glass-to-metal seals, and said capillary lining consists essentially of porous ceramic.